Figure 1:
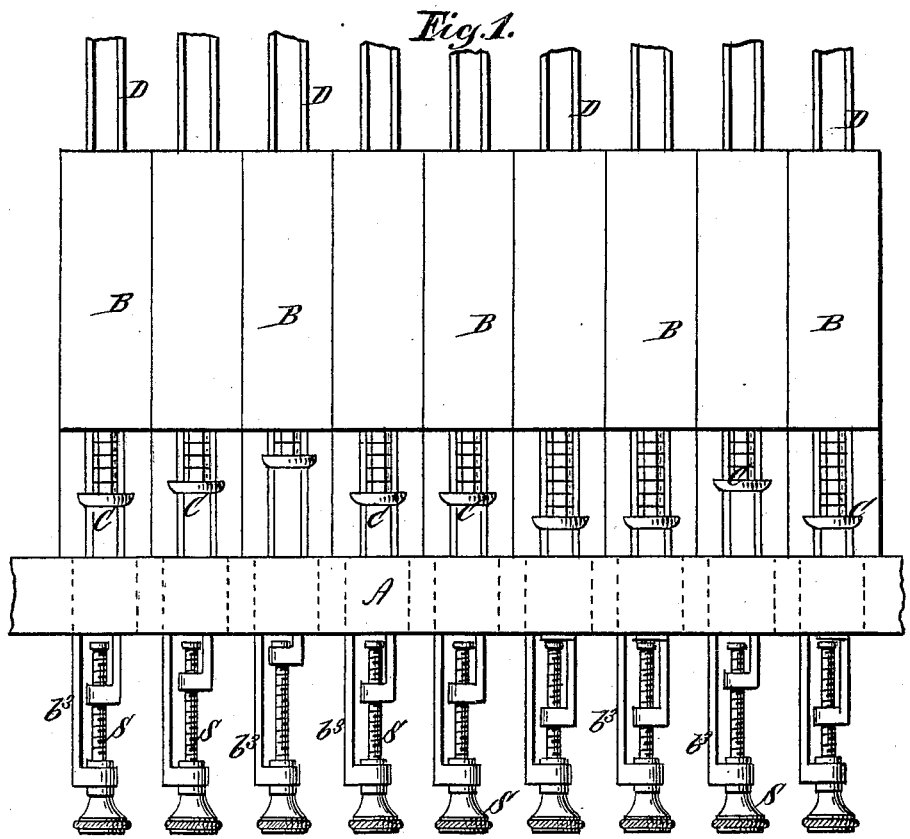

(No Model.) 5 Sheets—Sheet 1.
L. K. JOHNSON & A. A. LOW.
TYPE SETTING APPLIANCE.

No. 583,478. Patented June 1, 1897.

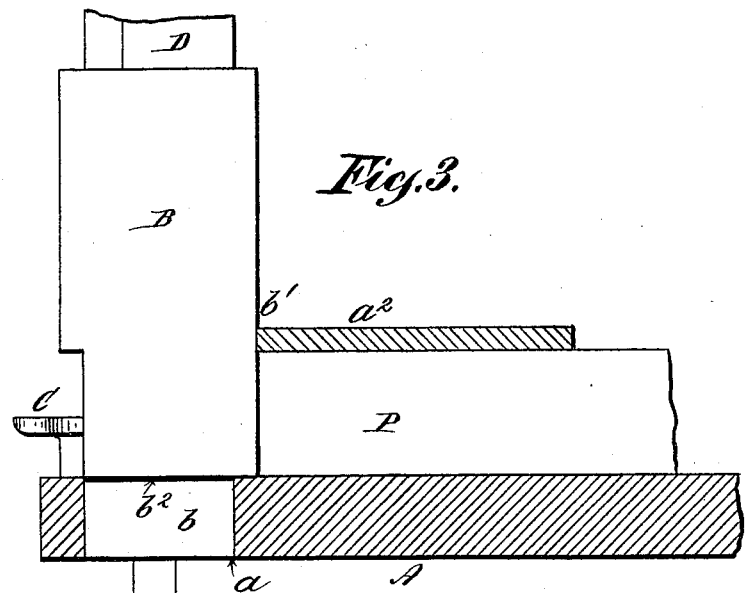
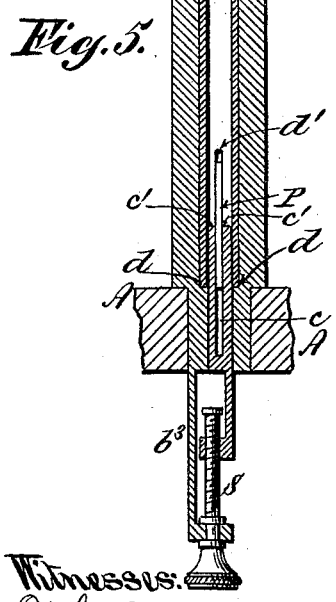
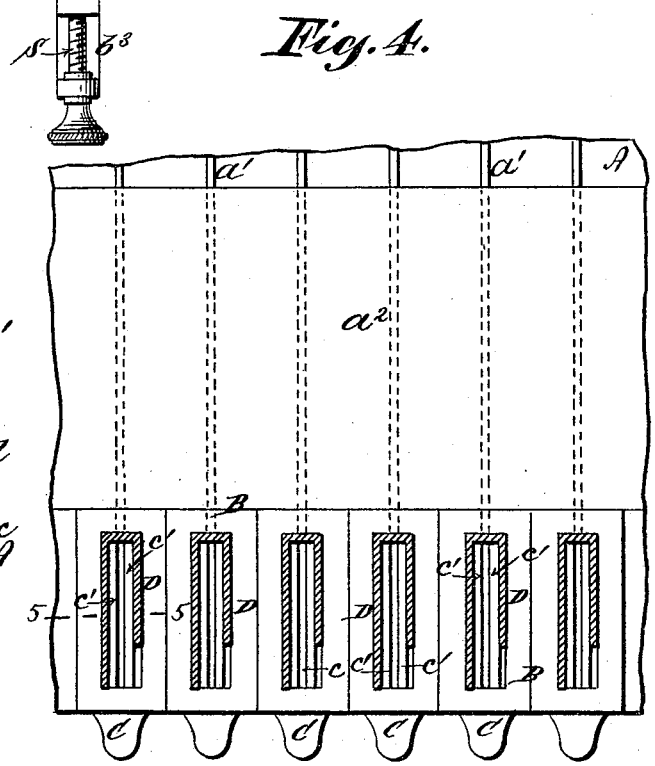

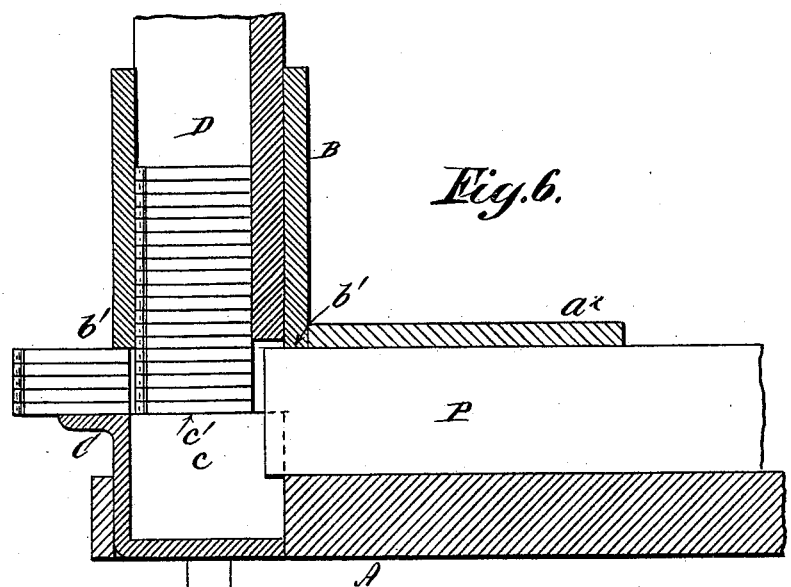
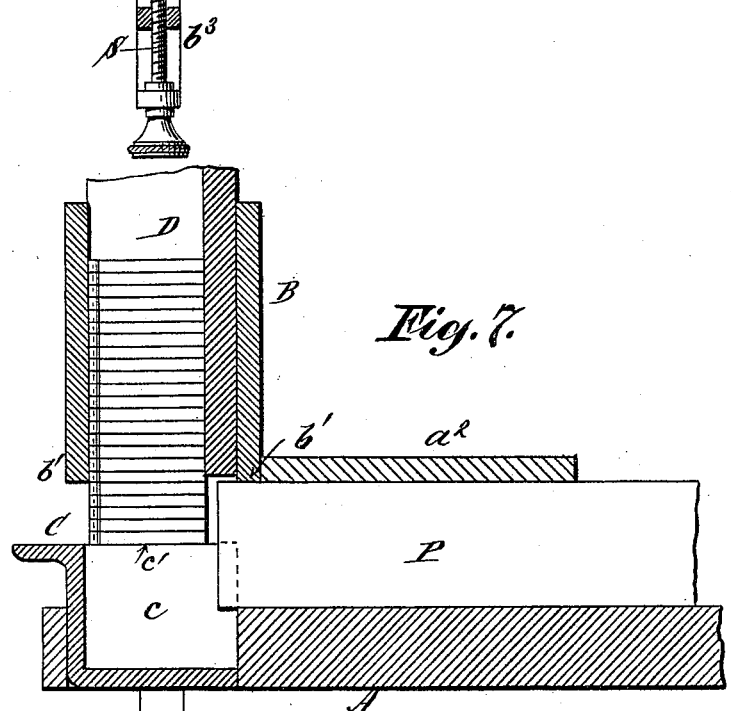

(No Model.) 5 Sheets—Sheet 4.
L. K. JOHNSON & A. A. LOW.
TYPE SETTING APPLIANCE.

No. 583,478. Patented June 1, 1897.

Witnesses:
D. W. Gardner.
A. A. Fellows.

Inventors:
Louis Kossuth Johnson
Abbot Augustus Low
By their Attorney
George William Miatt (No Model.) 5 Sheets—Sheet 5.
L. K. JOHNSON & A. A. LOW.
TYPE SETTING APPLIANCE.
No. 583,478. Patented June 1, 1897.
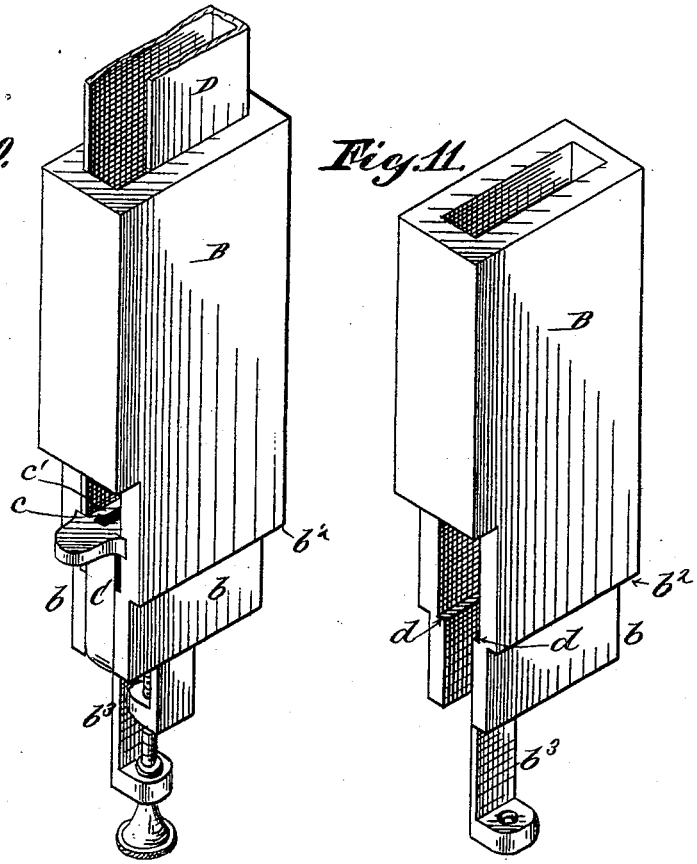
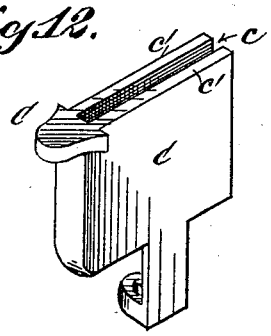
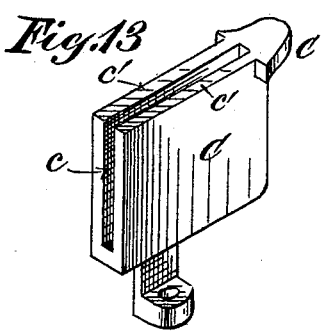
Witnesses:
D. W. Gardner.
A. N. Fellows
Inventors:
Louis Kossuth Johnson
Abbot Augustus Low
By their Attorney
George William Miatt
THE NORRIS PETERS CO., PHOTO-LITHO., WASHINGTON, D. C.

UNITED STATES PATENT OFFICE.

LOUIS KOSSUTH JOHNSON AND ABBOT AUGUSTUS LOW, OF BROOKLYN, NEW YORK, ASSIGNORS TO THE ALDEN TYPE MACHINE COMPANY, OF NEW YORK, N. Y.

TYPE-SETTING APPLIANCE.

SPECIFICATION forming part of Letters Patent No. 583,478, dated June 1, 1897.

Application filed March 30, 1896. Serial No. 585,405. (No model.)

*To all whom it may concern:*

Be it known that we, LOUIS KOSSUTH JOHNSON and ABBOT AUGUSTUS LOW, citizens of the United States, residing in the city of Brooklyn, in the county of Kings and State of New York, have invented certain new and useful Improvements in Type-Setting Appliances, of which the following is a specification sufficient to enable others skilled in the art to which the invention appertains to make and use the same.

Our present invention relates to the class of type-cases designated as "word-cases," in which the types of a word or combination are arranged one above the other in the type-containing channels, from the lower ends of which the words or combinations are forwarded into position for removal by the hand of the compositor. In type-cases of this character it is desirable that the parts be adapted to the requirements of words or combinations of different length, and we have heretofore devised means for effecting this result with the aid of a type-forwarder, which automatically adjusted itself to the adjustment of the guards, by which all but the lowest types are held in the channel, as in our last application for patent, Serial No. 582,713, filed March 11, 1896.

In our present application we seek to attain the same end in connection with a type-forwarder of maximum size, which reciprocates in a prescribed course by means of a type-support adjustable in the lower end of the channel and with relation to said type-forwarder and a fixed front type-guard on the channel-holder, the invention consisting in the construction and arrangement of parts, substantially as herein set forth, for attaining the result in a simple and effective manner.

By dispensing with the adjustment of the type-guards and by using a plain plate formed in one piece and with no attachment as a type-forwarder we greatly simplify and cheapen the structure, while rendering the adjustment of the parts much more convenient and effective.

Figure 2:
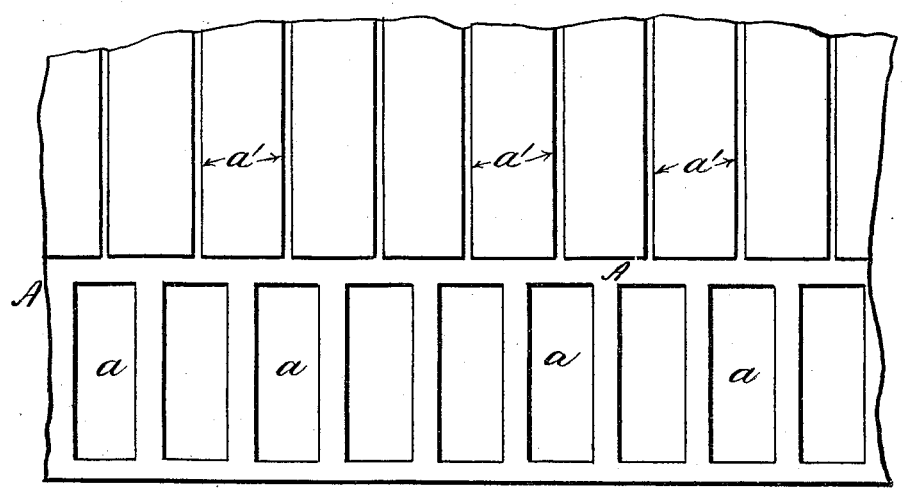
Figure 8:
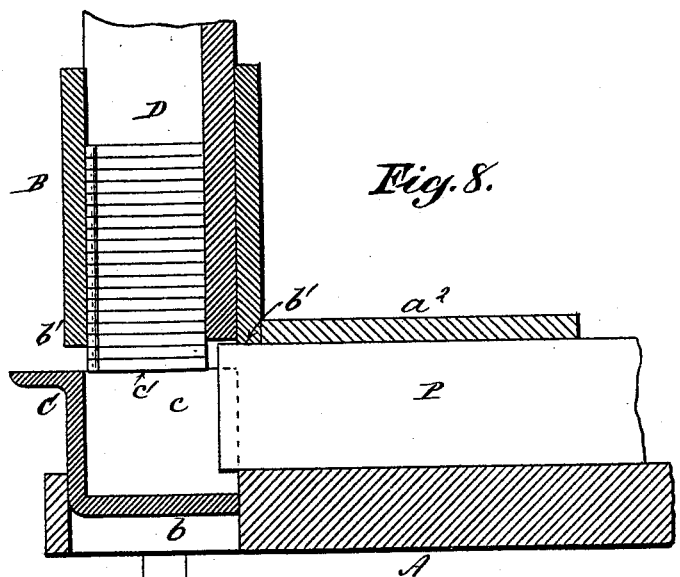
Figure 9:
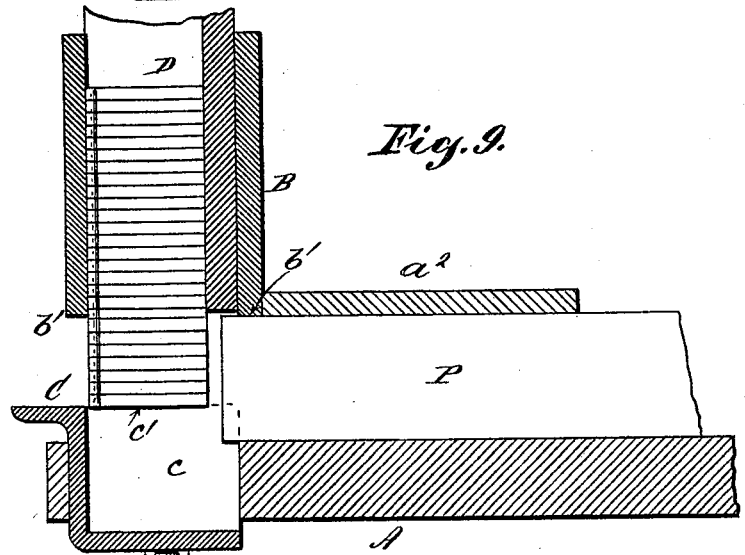

In the accompanying drawings, Figure 1 is a front view illustrating a series of nine channels, holders, &c., arranged according to our invention; Fig. 2, a plan of a portion of the supporting-bed, the channels, holders, &c., being removed; Fig. 3, a sectional elevation of the right-hand side of one of the holders, &c. Fig. 4 is a plan of several of the holders, the channels being shown in horizontal section. Fig. 5 is a vertical section upon plane of line 5 5, Fig. 4; Fig. 6, a central vertical section through the channel and adjoining parts, showing the types forwarded for removal; Fig. 7, a similar view showing the types about to be forwarded; Fig. 8, a similar view showing the parts arranged to detach and forward two types; Fig. 9, a similar view showing the parts arranged to detach and forward seven types. Fig. 10 is an isometrical view of the holder and channel. Fig. 11 is an isometrical view of the holder with the channel and type-support omitted. Fig. 12 is an isometrical view of the type-support; Fig. 13, a similar view taken from the rear.

The table or support A is formed with the mortises $a$ for the reception of the lower ends $b$ of the holders B and with the pusher-grooves $a'$, in which the pusher-blades P rest.

The holder B is made in one piece, with the exception of the adjustable type-support C, being formed with the front and rear type-guards $b'$ $b'$, which are permanent and stationary. The shoulders $b^2$ support the holder on the table A in fixed relation to the pusher P, which reciprocates horizontally over the table A and is confined therein by a cap $a^2$. Between the lower side walls $b$ $b$, which constitute the tenon which enters the mortise $a$, rests the type-support C, its lower end engaging with the adjusting-screw S, mounted on an extension $b^3$ of the lower end of one side wall.

The lower end of the channel D is supported on shoulders $d$ $d$, formed in the holder, and the lower end of its spine is slotted, as at $d'$, to admit the forward end of the pusher P. The position of the channel-supporting shoulders $d$ $d$ corresponds horizontally with the lower edge of the pusher.

The type-support C is also formed with a vertical slot $c$, coinciding in width with the thickness of the pusher, so that the support C can be raised and lowered without interference with the pusher, but with relation thereto. The formation of the slot $c$ leaves a type-supporting surface $c'$ $c'$ on either side thereof, upon which the types rest when in position in the channel. The pusher P being thus practically fixed in position horizontally and vertically, while free to reciprocate horizontally, and the guards $b'$ $b'$ being fixed in position, it is obvious that the position of the type-support C with relation thereto will govern the number of types to be detached and forwarded. Thus in Fig. 8 the parts are adjusted for the removal of two types; in Figs. 6 and 7, for the removal of five types, while in Fig. 9 the parts are adjusted for the removal of seven types simultaneously, the adjustment being effected quickly and conveniently by means of a simple screw S or equivalent device.

What we claim as our invention, and desire to secure by Letters Patent, is—

1. A type-channel holder formed with a fixed type-channel support and an adjustable type-support in combination with a type-forwarder having a fixed relation to said channel-support, substantially in the manner and for the purpose described.

2. The combination of a channel-holder formed with a fixed channel-support and fixed type-guard, a reciprocating type-forwarder having a prescribed relation to said channel-support, a type-containing channel slotted at its lower end to admit of the passage of the pusher, and an adjustable type-support also slotted to admit the type-forwarder, substantially in the manner and for the purpose described.

3. The combination of the supporting-platform A, formed with the mortises $a$, and grooves $a'$, the channel-holder B, formed with the tenons $b$, for entering the said mortises $a'$, the reciprocating type-forwarder P, the adjustable type-platform C, and the type-containing channel D, formed with the slot $d'$, the whole arranged and operating substantially in the manner and for the purpose described.

4. The combination with the holder B, channel D, pusher P, and type-support C, of the adjusting-screw S, mounted upon the holder and engaging with the type-support C, substantially in the manner and for the purpose described.

LOUIS KOSSUTH JOHNSON.
ABBOT AUGUSTUS LOW.

Witnesses:
D. W. GARDNER,
GEO. WM. MIATT.